United States Patent
Lang et al.

[15] 3,659,851
[45] May 2, 1972

[54] BOARD GAME APPARATUS

[72] Inventors: James W. Lang; Emma P. Lang, both of P.O. Box 224, Mound, Minn. 55364

[22] Filed: Aug. 25, 1970

[21] Appl. No.: 66,846

[52] U.S. Cl. ................................273/130 B, 35/31 F
[51] Int. Cl. .............................................A63f 3/00
[58] Field of Search ..........................273/130, 135

[56] References Cited

UNITED STATES PATENTS 2,871,581  2/1959  Guzak ..........................273/135 B X
2,769,640  11/1956  Elder............................273/135 B

*Primary Examiner*—Delbert B. Lowe
*Attorney*—Orrin M. Haugen

[57] ABSTRACT

A mathematical game board apparatus comprising game board means having horizontally and vertically disposed lines defining a playing area with a plurality of rows and columns of squares defined by said lines. Indicia means are provided in alignment with the rows and columns with each indicia representing a certain mathematical factor or addend, the square at each intersection of a row and a column containing a numeral which represents a result in which each corresponding mathematical factor or addend is an input function. A generally transparent block is provided, this block being adapted to cover an area three squares wide and three squares long, and a plurality of generally opaque tokens are provided, the individual tokens being adapted to be removably placed on the surface of the generally transparent block to conceal the indicia displayed upon the square disposed beneath the respective token. In use, the generally transparent block provides a playing field for tic-tac-toe.

2 Claims, 2 Drawing Figures

Patented May 2, 1972 3,659,851

INVENTORS
JAMES W. LANG
EMMA P. LANG
BY Orrin M. Haugen
ATTORNEY 3,659,851

BOARD GAME APPARATUS

BACKGROUND OF THE INVENTION

The present invention relates generally to an educational mathematical game, and more particularly to a mathematical game having means for utilizing the concept of tic-tac-toe in combination with certain mathematical functions to instruct students in number facts. This mathematical game employs a game board apparatus together with a generally transparent block and opaque tokens which are used, in combination, to instruct beginning arithmetic or mathematical students in numerical concepts.

It is the general purpose of the present invention to develop arithmetic skill through a game device which combines arithmetic skill, chance, and the ability to defeat an opponent in tic-tac-toe. The apparatus of the present invention may be utilized for improving or developing skills in either multiplication or addition, and also for thinking in terms of inverse functions. Also, the game may be designed to represent various numerical systems and number bases, in order to familiarize the player with these various systems and bases. The game board provides an ideal device for teaching these concepts to students, this being accomplished by the placement of a token or tally in an area or square which carries a numerical value associated with a pair of given input numerals.

The game board area is provided with a given set or number of playing areas. The playing area for an individual play event is defined by the area disposed beneath the generally transparent block. The various vertical and horizontal lines which are covered by the generally transparent block provide a limited zone for tic-tac-toe. As indicated, the individual squares contain a numerical indicia which is a resultant from the combined factors or addends of the row indicia and column indicia. For use in connection with the multiplication tables, the numbers in the outer edges represent the individual factors of respective products, and the inner squares carry indicia representative of the product. For use in addition, the numbers in the outer edges represent addends of sums and the individual squares arranged at intersections of respective rows and columns carry indicia representative of the respective sums.

The generally transparent block is preferably formed of a size adapted to cover a generally square pre-selected playing field covering three rows and three columns. The tokens provided for the tic-tac-toe are preferably round and have a diameter generally equal to the edge dimension of the respective squares.

For conducting the play, the generally transparent block is placed on the playing board, and covers squares representative of intersections of three rows and three columns. One contestant places a token on the block and covers one of the individual indicia in the squares. The other contestant will then place a token on the block so as to cover a different square, and when one of the contestants succeeds in having three tokens in a line, he then receives a score based upon his ability to predict the number or indicia displayed upon the square disposed immediately beneath his individual tokens.

The concept may be utilized to improve skills in addition and multiplication of numbers, and the game board apparatus and concept may also be utilized to teach skill in subtraction and division of numbers as well.

SUMMARY OF THE INVENTION

Therefore, it is a primary object of the present invention to provide a game board apparatus which may be utilized for developing arithmetic and mathematical skills.

It is a further object of the present invention to provide a game board apparatus which may be utilized to teach number facts to students by combining a game of chance with the element of numerical skill determining the winner.

It is yet a further object of the present invention to provide a game board which is divided into rows and columns, with the outer edges of the individual rows and columns being provided with numerical indicia, the inner squares being associated with a pair of numbers arranged in these outer squares, such as in a multiplication table or in an addition table, the game board being provided with a transparent block or sheet and generally opaque tokens for utilizing a pre-selected area for an arithmetic game of tic-tac-toe.

Other and further objects of the present invention will become apparent to those skilled in the art upon a study of the following specification, appended claims, and accompanying drawing.

DESCRIPTION OF THE PREFERRED EMBODIMENT

Figure 1:
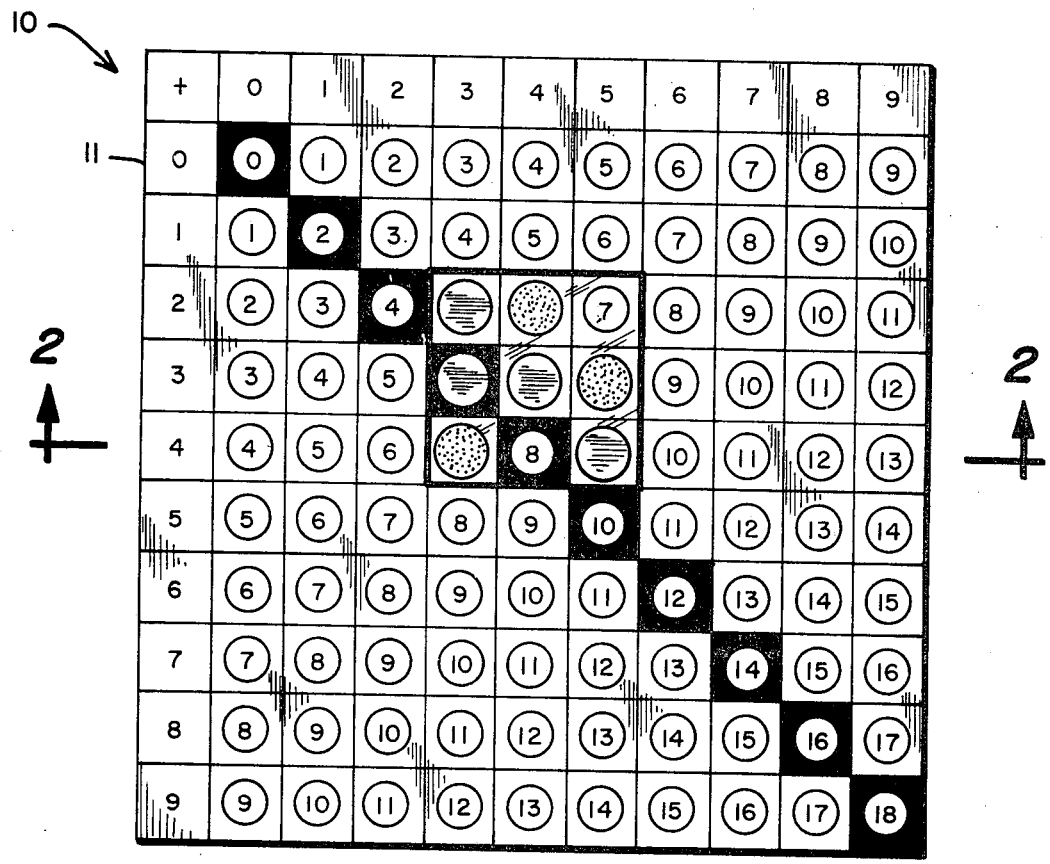
FIG. 1 is a top plan view of a game board apparatus fabricated in accordance with the present invention, and showing the positioning of a generally transparent block covering a predetermined limited number of pre-selected squares.
Figure 2:
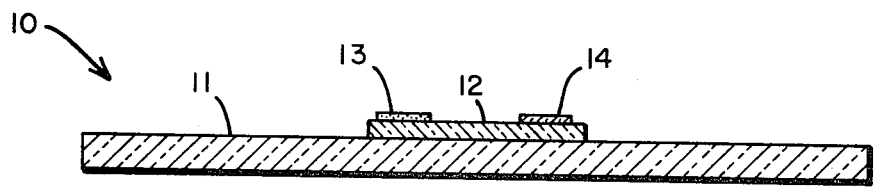
FIG. 2 is a vertical sectional view taken along the line and in the direction of the arrows 2—2 of FIG. 1.

In accordance with the preferred modification of the present invention, and with particular attention being directed to FIG. 1, there is illustrated a game board apparatus generally designated 10 which includes a group of rows and columns, the outer margin of each of the individual rows and columns being provided with numerical indicia corresponding to a given numbering system. In the illustration of FIG. 1, conventional base 10 numerals are given. The numerals arranged along the outer margin may be consecutively positioned, as indicated, or they may be randomly positioned to provide a more difficult task for the student to accurately predict the individual indicia during the playing sequence. The game board per se, identified by the numeral 11, has a generally transparent block disposed over a plurality of individual rows and columns, this block being shown at 12. The generally transparent block may be constructed of a suitable transparent material such as methyl methacrylate, or the like. A plurality of generally opaque tokens are also provided, these tokens being shown at 13 and 14, for example, in FIG. 2. The size of the transparent block is preferably correlated with the size of three rows and three columns, so as to provide an appropriate playing area for tic-tac-toe utilizing the individual rows and columns of the game board 11. Also, the tokens are generally of a predetermined size so as to substantially match the edge dimension of the individual squares, thus providing an opaque covering for the numerical indicia appearing on the surface of the game board 11, and particularly at the intersections of predetermined rows and columns.

During the play of the game, the transparent block 12 is first placed on the surface of the game board 11 at a selected area, so as to cover three rows and three columns. The first player will then place one of his tokens in a selected position on the block 12, such as in the area occupied by the token 13. The opponent then places one of his tokens, such as the token 14, in a selected specific location on the transparent block 12. Preferably, each player has tokens of different color in order to permit ready identification during the playing sequence. In the illustration of FIG. 1, the second player ultimately places three of his tokens in a row, diagonally disposed, thus causing him to prevail in this portion of the playing sequence. He then removes the individual tokens, one at a time, and declares, in advance, the numeral which appears beneath each of his respective tokens. The player receives a score for accurate prediction of the concealed numeral. Upon removal of token 14, the player will announce or predict that the numeral indicated is the number 9. The same player, upon removing the token placed at the intersection of the row "3" and the column "4" will announce that the numeral is the number 7. It will be appreciated, therefore, that each of the individual squares representing intersections of rows and columns will carry the result indicia, even though certain indicia are indicated as being concealed by tokens in FIG. 1.

The game board 11 is preferably fabricated from plastic, wood, metal, or plastic-paper laminate. Game board materials of this type are, of course, commercially available.

It will be apparent that the game board structure may be employed to teach number concepts for a variety of arithmetic or mathematical functions, including both addition and subtraction, as well as multiplication and division. The specific arrangement of the board can also be designed to accommodate number bases in addition to the commonly utilized base 10.

We claim:

1. A mathematical game board apparatus comprising a game board having horizontally and vertically disposed lines defining a playing area with at least four horizontally disposed rows and at least four vertically disposed columns forming a plurality of squares, said squares having an outer edge periphery arranged therearound;
   a. indicia displayed on said board and arranged adjacent said rows and columns and being disposed outwardly from said outer edge periphery with each indicia aligned with a row or a column and representing a mathematical factor or addend; the squares at the intersections of rows and columns each having an indicia displayed therein representing a predetermined resultant quantity in which each corresponding mathematical factor or addend is an input function;
   b. a generally transparent block adapted to cover a selected area three columns wide and three rows deep; and
   c. a plurality of generally opaque tokens having a size generally matching that of said squares, and being adapted to be removably placed on the surface of said generally transparent block to conceal the indicia displayed upon the square disposed beneath the respective token.

2. The mathematical game board apparatus as defined in claim 1 being particularly characterized in that said tokens are round discs having a diameter generally equal to the edge dimension of said squares.

* * * * *